United States Patent
Ito et al.

(10) Patent No.: US 11,654,651 B2
(45) Date of Patent: May 23, 2023

(54) SHEET, HEATING ELEMENT, AND HEATING DEVICE

(71) Applicants: LINTEC CORPORATION, Tokyo (JP); LINTEC OF AMERICA, INC., Phoenix, AZ (US)

(72) Inventors: Masaharu Ito, Tokyo (JP); Kanzan Inoue, Phoenix, AZ (US)

(73) Assignees: LINTEC CORPORATION, Tokyo (JP); LINTEC OF AMERICA, INC., Phoenix, AZ (US)

( * ) Notice: Subject to any disclaimer, the term of this patent is extended or adjusted under 35 U.S.C. 154(b) by 0 days.

(21) Appl. No.: 15/777,114

(22) PCT Filed: Nov. 17, 2016

(86) PCT No.: PCT/JP2016/084145
§ 371 (c)(1),
(2) Date: May 17, 2018

(87) PCT Pub. No.: WO2017/086395
PCT Pub. Date: May 26, 2017

(65) Prior Publication Data
US 2018/0326697 A1    Nov. 15, 2018

Related U.S. Application Data

(60) Provisional application No. 62/258,342, filed on Nov. 20, 2015.

(51) Int. Cl.
*B32B 5/02* (2006.01)
*B32B 5/26* (2006.01)
(Continued)

(52) U.S. Cl.
CPC ............... *B32B 5/02* (2013.01); *B32B 3/085* (2013.01); *B32B 5/26* (2013.01); *B32B 7/03* (2019.01);
(Continued)

(58) Field of Classification Search
CPC ......... B01J 21/185; B01J 21/205; D01F 9/12; H01L 51/0048; H01L 51/444;
(Continued)

(56) References Cited

U.S. PATENT DOCUMENTS 2,340,259 A    1/1944   Cheyney
4,370,548 A *  1/1983   Nagasawa ............... F16L 47/22
                                                          219/535
(Continued)

FOREIGN PATENT DOCUMENTS

CA    2536815 A1 *  3/2004   ............ C02F 1/4672
JP    H09-275293 A    10/1997
(Continued)

OTHER PUBLICATIONS

International Search Report issued in Application No. PCT/JP2016/084145 dated Feb. 7, 2017, with English translation.
(Continued)

*Primary Examiner* — Justin C Dodson
(74) *Attorney, Agent, or Firm* — McDermott Will & Emery LLP (57) ABSTRACT

A sheet includes a pseudo-sheet structure including a plurality of linear-bodies with a volume resistivity R of from $1.0 \times 10^{-7}$ Ωcm to $1.0 \times 10^{-1}$ extending in one direction, aligned parallel to one another, and spaced apart from one another, satisfies the relation: $L/D \geq 3$, wherein D represents the diameter of the linear-bodies, and L represents the spacing between adjacent ones of the linear-bodies, and also satisfies the relation: $(D^2/R) \times (1/L) \geq 0.003$, wherein D rep-
(Continued)

resents the diameter of the linear-bodies, L represents the spacing between adjacent ones of the linear-bodies, R represents the volume resistivity of the linear-bodies, and D and L are in units of cm. A heating element and a heating device each include the sheet.

17 Claims, 6 Drawing Sheets

(51) Int. Cl.
| | |
|---|---|
| *B32B 7/12* | (2006.01) |
| *H05B 3/84* | (2006.01) |
| *B32B 15/08* | (2006.01) |
| *B32B 27/10* | (2006.01) |
| *B32B 17/06* | (2006.01) |
| *B32B 27/08* | (2006.01) |
| *B32B 27/30* | (2006.01) |
| *B32B 7/06* | (2019.01) |
| *B32B 29/00* | (2006.01) |
| *B32B 3/08* | (2006.01) |
| *B32B 7/03* | (2019.01) |

(52) U.S. Cl.
CPC ............... *B32B 7/06* (2013.01); *B32B 7/12* (2013.01); *B32B 15/08* (2013.01); *B32B 17/061* (2013.01); *B32B 27/08* (2013.01); *B32B 27/10* (2013.01); *B32B 27/308* (2013.01); *B32B 29/002* (2013.01); *H05B 3/84* (2013.01); *B32B 2255/10* (2013.01); *B32B 2255/20* (2013.01); *B32B 2262/106* (2013.01); *B32B 2307/202* (2013.01); *B32B 2307/412* (2013.01); *B32B 2405/00* (2013.01); *B32B 2419/00* (2013.01); *B32B 2457/00* (2013.01); *B32B 2605/006* (2013.01)

(58) Field of Classification Search
CPC ........... H01L 51/0045; H01L 21/02606; H01L 29/0669; H01L 29/413; H01J 2201/30469; H01J 2329/0455; Y10S 977/742; Y10S 977/842; H05B 3/10; H05B 3/145; H05B 3/18; H05B 3/20; H05B 3/267; H05B 3/286; H05B 3/34; H05B 3/36; H05B 3/40; H05B 3/46; H05B 3/48; H05B 3/84; H05B 3/86
See application file for complete search history.

(56) References Cited

U.S. PATENT DOCUMENTS

| | | | |
|---|---|---|---|
| 2004/0069762 A1* | 4/2004 | Yoneyama | H05B 3/34 219/217 |
| 2006/0144709 A1* | 7/2006 | Belt | C02F 1/46104 204/554 |
| 2008/0099458 A1* | 5/2008 | Hilmer | B60N 2/5685 219/217 |
| 2010/0059495 A1 | 3/2010 | D'Haene | |
| 2010/0310809 A1* | 12/2010 | Jiang | B32B 5/26 428/41.8 |
| 2012/0250464 A1 | 10/2012 | Jiang et al. | |
| 2012/0250901 A1 | 10/2012 | Jiang et al. | |
| 2012/0250902 A1 | 10/2012 | Jiang et al. | |
| 2012/0250903 A1 | 10/2012 | Jiang et al. | |
| 2012/0250904 A1 | 10/2012 | Jiang et al. | |
| 2012/0250905 A1 | 10/2012 | Jiang et al. | |
| 2012/0250906 A1 | 10/2012 | Jiang et al. | |
| 2012/0250907 A1 | 10/2012 | Jiang et al. | |
| 2015/0289366 A1 | 10/2015 | Frey et al. | |
| 2015/0327334 A1 | 11/2015 | Choi et al. | |
| 2016/0011698 A1* | 1/2016 | Tajiri | G03F 7/32 345/174 |
| 2016/0119977 A1* | 4/2016 | Caldeira | H05B 3/145 219/539 |
| 2016/0342247 A1* | 11/2016 | Jin | C03C 17/09 |
| 2018/0056449 A1* | 3/2018 | Zhu | B23K 35/025 |

FOREIGN PATENT DOCUMENTS

| | | | | |
|---|---|---|---|---|
| JP | H09275293 A | * | 10/1997 | ............... B32B 5/02 |
| JP | 2008-523254 A | | 7/2008 | |
| JP | 2008523254 A | * | 7/2008 | ........ B01L 3/502707 |
| JP | 2012-205198 A | | 10/2012 | |
| JP | 2012-209920 A | | 10/2012 | |
| JP | 2014-084255 A | | 5/2014 | |
| KR | 10-2010-0049304 A | | 5/2010 | |
| WO | 2014/088798 A1 | | 6/2014 | |

OTHER PUBLICATIONS

Extended European Search Report issued in corresponding European Patent Application No. 16866396.1-1107, dated Jun. 14, 2019.
European Office Action issued in corresponding European Patent Application No. 16866396.1-1107, dated Oct. 14, 2021.
Taiwanese Office Action issued in corresponding Taiwanese Patent Application No. 109136304, dated Aug. 19, 2022, with English translation.
Korean Office Action issued in corresponding Korean Patent Application No. 10-2018-7016495, dated Feb. 24, 2023, with English translation.

* cited by examiner

SHEET, HEATING ELEMENT, AND HEATING DEVICE

RELATED APPLICATIONS

This application is a national stage of International Application No. PCT/JP2016/084145, filed Nov. 17, 2016, which claims the benefit of U.S. Provisional Application No. 62/258,342, filed on Nov. 20, 2015, the disclosures of which are incorporated in their entirety by reference herein.

TECHNICAL FIELD

The present invention relates to a sheet, a heating element, and a heating device.

BACKGROUND ART

There is conventionally known a method of producing a linear-body including carbon nanotubes (such as a ribbon-shaped or thread-shaped linear-body) using a carbon nanotube forest (for example, Japanese National-Phase Publication (JP-A) No. 2008-523254). A linear-body including carbon nanotubes is produced by this method, for example, as follows. First, a carbon nanotube forest is grown on the surface of a substrate by chemical vapor deposition (CVD). One end of the carbon nanotube forest grown on the substrate surface is drawn using a jig, so that a carbon nanotube bundle (a carbon nanotube ribbon) is obtained. In addition, a thread including carbon nanotubes is obtained by forming the carbon nanotube bundle (carbon nanotube ribbon) into a strand.

Document 1: JP-A No. 2008-523254

SUMMARY OF INVENTION

Technical Problem

Conductive linear-bodies (linear-bodies with a volume resistivity R of from $1.0 \times 10^{-7}$ Ωcm to $1.0 \times 10^{-1}$ Ωcm) typified by linear-bodies including carbon nanotubes can be used, for example, as light, thin, and high-strength wires. If such linear-bodies are bundled to form a pseudo-sheet structure, the structure could be used for various types of sheet-shaped products. For example, the structure could be used as a member for various products, such as a heating element for heating devices, a heating textile material, or a protective film (shatterproof film) for displays. In the heating element applications, some heating elements are required to have light transparency. In such a case, the sheet-shaped products are also required to have low surface resistance for reduction of the applied voltage, in addition to light transparency.

Solution to Problem

The present disclosure includes the following aspects.

<1> A sheet including a pseudo-sheet structure including a plurality of linear-bodies with a volume resistivity R of from $1.0 \times 10^{-7}$ Ωcm to $1.0 \times 10^{-1}$ Ωcm extending in one direction, arranged parallel to one another, and spaced apart from one another, the sheet satisfying the relation: $L/D \geq 3$, wherein D represents a diameter of the linear-bodies, and L represents a spacing between adjacent ones of the linear-bodies, and also satisfying the relation: $(D^2/R) \times (1/L) \geq 0.003$, wherein D represents the diameter of the linear-bodies, L represents the spacing between adjacent ones of the linear-bodies, R represents the volume resistivity of the linear-bodies, and D and L are in units of cm.

<2> The sheet according to <1>, wherein the linear-bodies include carbon nanotubes.

<3> The sheet according to <1> or <2>, wherein the linear-bodies include carbon nanotubes and have a diameter of from 1 μm to 125 μm.

<4> The sheet according to any one of <1> to <3>, wherein the linear-bodies include carbon nanotubes and a metal.

<5> The sheet according to any one of <1> to <4>, further including an adhesive layer on which the pseudo-sheet structure is disposed.

<6> The sheet according to any one of <1> to <5>, which includes a laminate of a plurality of the pseudo-sheet structures.

<7> The sheet according to any one of <1> to <7>, wherein the linear-bodies of the pseudo-sheet structure each have an end part at least fixed with a fixing member and each have another independent part not in contact with any other member.

<8> A heating element including the sheet according to any one of <1> to <7>.

<9> A heating device including the heating element according to <8> and an electric supply part for supplying electricity to the heating element.

<10> The heating device according to <9>, which is a defogger.

<11> The heating device according to <9>, which is a deicer.

Advantageous Effects of Invention

The disclosure makes it possible to provide a sheet having a pseudo-sheet structure with high light transparency and low surface resistance. The disclosure also make it possible to provide a heating element having high light transparency and capable of working with lower applied voltages and to provide a heating device having such a heating element.

DESCRIPTION OF EMBODIMENTS

Hereinafter, an exemplary embodiment of the invention will be described in detail. In the description, the word "to"

used to express numerical value ranges means that the ranges include the values before and after "to" as the maximum and minimum values, respectively.

<Sheet>

Figure 1:
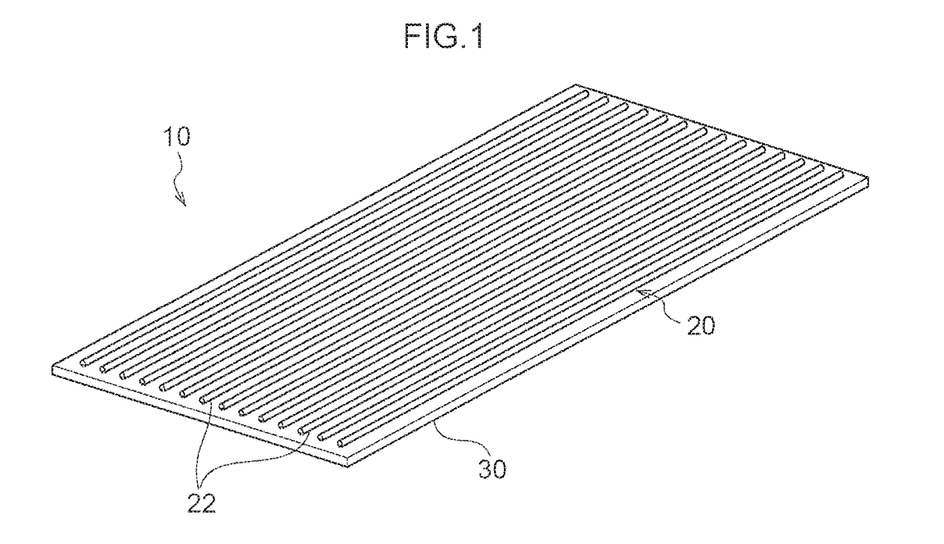
FIG. 1 is a schematic perspective view showing a sheet according to an embodiment.
Figure 2:
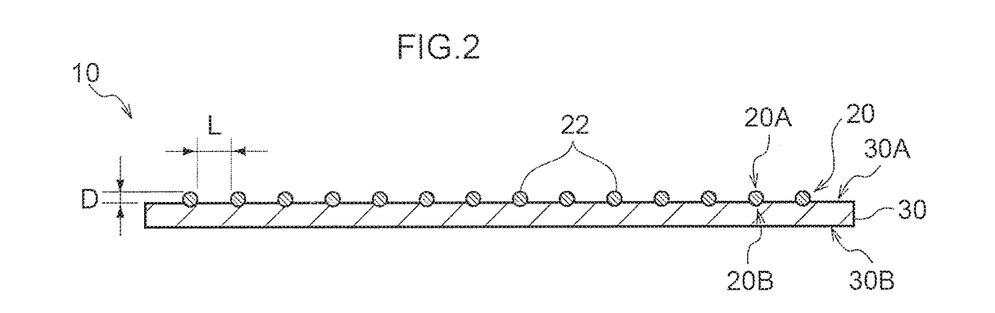
FIG. 2 is a schematic cross-sectional view showing a sheet according to an embodiment.

As shown in FIGS. 1 and 2, a sheet 10 according to an embodiment has, for example, a pseudo-sheet structure 20 and an adhesive layer 30. Specifically, for example, the pseudo-sheet structure 20 is disposed on the adhesive layer 30 in the sheet 10.

Hereinafter, the reference sign 20A represents one surface of the pseudo-sheet structure 20 opposite to its surface on which the adhesive layer 30 is disposed (hereinafter referred to as the "first surface 20A"). The reference sign 20B represents the other surface of the pseudo-sheet structure 20 on which the adhesive layer 30 is disposed (hereinafter referred to as the "second surface 20B") (see FIG. 2). The reference sign 30A represents one surface of the adhesive layer 30 on which the pseudo-sheet structure 20 is disposed (hereinafter referred to as the "first adhesive surface 30A"). The reference sign 30B represents the other surface of the adhesive layer 30 opposite to its surface on which the pseudo-sheet structure 20 is deposed (hereinafter referred to as the "second adhesive surface 30B") (see FIG. 2).

In the sheet 10 according to an embodiment, therefore, the pseudo-sheet structure 20 and the adhesive layer 30 are disposed on one another with the second surface 20B of the pseudo-sheet structure 20 facing the first adhesive surface 30A of the adhesive layer 30.

(Pseudo-Sheet Structure)

The pseudo-sheet structure 20 includes a plurality of linear-bodies 22 with a volume resistivity R of from $1.0 \times 10^{-7}$ Ωcm to $1.0 \times 10^{-1}$ Ωcm (hereinafter also referred to as "conductive linear-bodies") extending in one direction, arranged parallel to one another, and spaced apart from one another. Specifically, for example, the pseudo-sheet structure 20 includes a plurality of conductive linear-bodies 22 extending linearly and arranged at regular intervals in a direction perpendicular to the longitudinal direction of the conductive linear-bodies 22. In other words, the pseudo-sheet structure 20 includes, for example, the conductive linear-bodies 22 arranged in a stripe pattern.

The pseudo-sheet structure 20 satisfies the relation: $L/D \geq 3$, wherein D represents the diameter of the conductive linear-bodies 22, and L represents the spacing between adjacent ones of the conductive linear-bodies 22. The pseudo-sheet structure 20 also satisfies the relation: $(D^2/R) \times (1/L) \geq 0.003$, wherein D represents the diameter of the conductive linear-bodies 22, L represents the spacing between adjacent ones of the conductive linear-bodies 22, and R represents the volume resistivity of the conductive linear-bodies 22. In the formulae, D and L are in units of cm. When satisfying these relations, the pseudo-sheet structure 20 having the conductive linear-bodies 22 with a volume resistivity R in the specified range has high light transparency and low surface resistance. In addition, the sheet 10 can be easily bonded to an object with the first adhesive surface 30A of the adhesive layer 30 exposed through the pseudo-sheet structure 20 in the sheet 10 when the sheet 10 is attached to the object with the first surface 20A facing the object.

In view of the light transparency and surface resistance of the pseudo-sheet structure 20, the structure 20 preferably satisfies $350 \geq L/D \geq 3$, and more preferably satisfies $250 \geq L/D \geq 5$. In View of same point, the structure 20 preferably satisfies $20 \geq (D^2/R) \times (1/L) \geq 0.03$, more preferably satisfies $15 \geq (D^2/R) \times (1/L) \geq 0.5$, and still more preferably satisfies $10 \geq (D^2/R) \times (1/L) \geq 3$.

The structure 20 may satisfies $350 \geq L/D \geq 3$ and $7 \geq (D^2/R) \times (1/L) \geq 0.003$, or and may satisfies $250 \geq L/D \geq 5$ and $5 \geq (D^2/R) \times (1/L) \geq 0.004$.

The conductive linear-bodies 22 have a volume resistivity R of from $1.0 \times 10^{-7}$ 2 cm to $1.0 \times 10^{-1}$ Ωcm, preferably from $1.0 \times 10^{-6}$ Ωcm to $1.0 \times 10^{-1}$ Ωcm, more preferably from $1.0 \times 10^{-6}$ Ωcm to $1.0 \times 10^{-2}$ Ωcm, still more preferably from $1.0 \times 10^{-6}$ Ωcm to $4.0 \times 10^{-5}$ Ωcm. When the volume resistivity R of the conductive linear-bodies 22 is set in the above ranges, the surface resistance of the pseudo-sheet structure 20 can be easily reduced.

The volume resistivity R of the conductive linear-bodies 22 can be measured as follows. First, the diameter D of the conductive linear-body 22 is determined by the method described below. A silver paste is then applied to both ends of the conductive linear-body 22, in which a 40-mm-long part is measured for resistance in order to determine the resistance of the conductive linear-body 22. Assuming that the conductive linear-body 22 is a column with a diameter of D, the cross-sectional area of the conductive linear-body 22 is calculated and then multiplied by the measured length to give its volume. The resulting resistance is divided by the volume to calculate the volume resistivity R of the conductive linear-body 22.

The conductive linear-bodies 22 preferably have a diameter D of from 0.0001 cm (1 μm) to 0.0125 cm (125 μm). Particularly when the conductive linear-bodies 22 include carbon nanotubes, the conductive linear-bodies 22 preferably have a diameter of from 0.0003 cm (3 μm) to 0.0100 cm (100 μm), more preferably from 0.0005 cm (5 μm) to 0.007 cm (70 μm), still more preferably from 0.0005 cm (5 μm) to 0.004 cm (40 μm), most preferably from 0.0005 cm (5 μm) to 0.002 cm (20 μm).

When including carbon nanotubes and having a diameter of from 1 μm to 125 μm, the conductive linear-bodies 22 are prevented from snapping or breaking in the process of manufacturing the sheet 10 (pseudo-sheet structure 20). In addition, each conductive linear-body 22 is less visible to the naked eye, which leads to an improvement in the light transparency of the sheet 10 (pseudo-sheet structure 20). For example, therefore, the observer can easily see images (if there is a mirror, reflected images) on the opposite side through the sheet 10. Specifically, for example, when the sheet 10 is attached to a window, the observer can easily see the scene outside the window. The use of linear-bodies with a smaller diameter makes the pseudo-sheet structure 20 of the sheet 10 almost invisible to the naked eye, which makes it possible to see images more naturally through a window or a mirror.

The diameter D of the conductive linear-bodies 22 is determined as follows. Using a digital microscope, the conductive linear-bodies 22 of the pseudo-sheet structure 20 are observed and measured for diameter at randomly selected five sections. The diameter of the conductive linear-bodies 22 is defined as the average of the measurements.

The spacing L between the conductive linear-bodies 22 is preferably from 0.005 cm (50 μm) to 0.8 cm (8,000 μm), more preferably from 0.008 cm (80 μm) to 0.65 cm (6,500 pun). When the spacing L between the conductive linear-bodies 22 is set in the range of from 0.005 cm (50 μm) to 0.8 cm (8,000 μm), the light transparency of the pseudo-sheet structure 20 can be easily improved while its surface resistance is reduced.

The spacing L between the conductive linear-bodies 22 is determined as follows. Using a digital microscope, the conductive linear-bodies 22 of the pseudo-sheet structure 20 are observed and measured for the spacing between two adjacent conductive linear-bodies 22.

The spacing between two adjacent conductive linear-bodies 22 is the length of the space between two conductive linear-bodies 22 facing each other (see FIG. 2), in which the length is along the direction in which the conductive linear-bodies 22 are arranged. The conductive linear-bodies 22 may be arranged at irregular intervals. In such a case, the spacing L is the average of the distances between all adjacent pairs of conductive linear-bodies 22. In the pseudo-sheet structure 20, however, the conductive linear-bodies 22 are preferably arranged at substantially regular intervals in order to make it easy to control the spacing L value and to ensure the uniformity of the light transparency.

The conductive linear-bodies 22 may be of any type having a volume resistivity in the specified range. Preferably, the conductive linear-bodies 22 include carbon nanotubes (hereinafter, such linear-bodies are also referred to as "carbon nanotube linear-bodies"). Carbon nanotubes have higher thermal and electrical conductivities than various metals. Therefore, when carbon nanotube linear-bodies are used as the conductive linear-bodies 22, the light transparency of the pseudo-sheet structure 20 can be easily improved while its surface resistance is reduced. In addition, when used as a heating element, the sheet 10 (pseudo-sheet structure 20) can easily achieve rapid generation of heat. Using carbon nanotubes, it is also easy to obtain linear-bodies having a smaller diameter as mentioned above.

Carbon nanotube linear-bodies are obtained, for example, by a process that includes drawing carbon nanotube sheets from an end of a carbon nanotube forest (which is a structure produced by growing carbon nanotubes on a substrate in such a way that they are aligned in a direction perpendicular to the substrate, and is also called an "array" in some cases), bundling the drawn carbon nanotube sheets, and stranding the carbon nanotube bundle. In such a process, a ribbon-shaped carbon nanotube linear-body is obtained when twist is not performed in the stranding step, and a thread-shaped linear-body is obtained when twist is performed. The ribbon-shaped carbon nanotube linear-body does not have a structure in which carbon nanotubes are twisted. Alternatively, a carbon nanotube linear-body can be obtained, for example, by spinning from a dispersion of carbon nanotubes. The production of a carbon nanotube linear-body by spinning can be performed, for example, by the method disclosed in US 2013/0251619 A (Japanese Patent Application Laid-Open (JP-A) No. 2011-253140). A thread-shaped carbon nanotube linear-body is preferably used in order to obtain uniformity with respect to the carbon nanotube linear-body diameter. A thread-shaped carbon nanotube linear-body is preferably obtained by twisting carbon nanotube sheets in order to obtain a high-purity carbon nanotube linear-body. Two or more carbon nanotube linear-bodies may also be knitted into a linear-body.

Alternatively to the carbon nanotube linear-bodies, the conductive linear-bodies 22 may be linear-bodies including carbon nanotubes and a metal (hereinafter also referred to as "composite linear-bodies"). The composite linear-bodies can easily have higher conductivity while maintaining the characteristics of carbon nanotube linear-bodies mentioned above. In other words, the composite linear-bodies can easily reduce the resistance of the pseudo-sheet structure 20.

Examples of the composite linear-body include (1) a composite linear-body formed by a process that includes drawing carbon nanotube sheets from an end of a carbon nanotube forest, bundling the drawn carbon nanotube sheets, and then stranding the carbon nanotube bundle, in which an elementary metal or a metal alloy is deposited on the surface of the forest, sheets, bundle, or stranded linear-body by vapor deposition, ion plating, sputtering, wet plating, or other methods; (2) a composite linear-body formed by stranding a carbon nanotube bundle together with an elementary metal linear-body(s), a metal alloy linear-body(s), or a composite linear-body(s); and (3) a composite linear-body formed by knitting an elementary metal linear-body, a metal alloy linear-body, or a composite linear-body and a carbon nanotube linear-body or a composite linear-body. In the process of forming the composite linear-body (2), a metal may be deposited, as in the process of forming the composite linear-body (1), when the carbon nanotube bundle is stranded. The composite linear-body (3) is formed by knitting two linear-bodies. Alternatively, three or more linear-bodies including at least one elementary metal linear-body, metal alloy linear-body, or composite linear-body and a carbon nanotube linear-body(s), an elementary metal linear-body(s), a metal alloy linear-body(s), or a composite linear-body(s) may be knitted.

The metal in the composite linear-body may be, for example, an elementary metal such as gold, silver, copper, iron, aluminum, nickel, chromium, tin, or zinc, or an alloy containing at least one of these elementary metals (such as a copper-nickel-phosphorus alloy or a copper-iron-phosphorus-zinc alloy).

the conductive linear-bodies 22 may be linear bodies including an electroconductive yarn. The linear bodies including an electroconductive yarn may be linear bodies made of a single electroconductive yarn, or linear bodies in which plural electroconductive yarns are twisted with each other Examples of a metal wire include: a wire containing a metal such as copper, aluminum, tungsten, iron, molybdenum, nickel, titanium, silver, or gold; and a wire containing an alloy (for example, a steel such as stainless steel or carbon steel, brass, phosphor bronze, zirconium-copper alloy, beryllium copper, iron-nickel, nichrome, nickel-titanium, Kanthal, Hastelloy, or rhenium-tungsten) containing two or more kinds of metals. Further, the metal wire may be a metal wire plated with tin, zinc, silver, nickel, chromium, a nickel-chromium alloy, or a solder. Alternatively, the metal wire may be a metal wire whose surface is coated with a carbon material or a polymer to be described later. Particularly a wire containing one or more metals selected from tungsten, molybdenum, and an alloy containing these is preferable from the viewpoint of forming the conductive linear body 22 having low volume resistivity.

The metal wire may include a metal wire coated with a carbon material. When the metal wire is coated with a carbon material, the metallic gloss is reduced and it becomes easy to make the presence of the metal wire inconspicuous. Further, when the metal wire is coated with a carbon material, a corrosion of the metal can also be inhibited.

Examples of the carbon material for coating the metal wire include: amorphous carbons such as carbon blacks, activated carbons, hard carbons, soft carbons, mesoporous carbons, and carbon fibers; graphites; fullerenes; graphenes; and carbon nanotubes.

(Adhesive Layer)

The adhesive layer 30 is a layer including an adhesive. The adhesive layer 30 is provided on the second surface 20B of the pseudo-sheet structure 20 to form the sheet 10. The adhesive layer 30 allows the sheet 10 to be easily bonded to an object. It should be noted that the adhesive layer 30 is an optional layer. The sheet 10 can be bonded to an object with the first surface 20A facing the object. In this case, the first adhesive surface 30A of the adhesive layer 30, which is exposed through the pseudo-sheet structure 20 in the sheet 10, allows the sheet 10 to be easily bonded to the object. Alternatively, the sheet 10 may be bonded to an object with the second adhesive surface 30B facing the object.

The adhesive layer 30 is preferably curable. When cured, the adhesive layer 30 acquires hardness enough to protect the pseudo-sheet structure 20 and to function as a protective film. The cured adhesive layer 30 has improved impact resistance and resists impact-induced deformation.

The adhesive layer 30 is preferably curable with energy rays such as ultraviolet rays, visible energy rays, infrared rays, or electron beams so that it can be simply cured in a short time. The term "curable with energy rays" also means "thermally curable by heating with energy rays."

The conditions of curing with energy rays depend on the type of energy rays used. For example, when ultraviolet irradiation is performed for curing, the ultraviolet irradiation dose is preferably from 10 mJ/cm$^2$ to 3,000 mJ/cm$^2$, and the irradiation time is preferably from 1 second to 180 seconds.

The adhesive in the adhesive layer 30 may also be what is called a heat sealable adhesive, which is capable of being bonded by heating, or an adhesive that becomes tacky when allowed to swell. In view of ease of application, however, the adhesive layer 30 is preferably a pressure-sensitive adhesive layer made of a pressure-sensitive adhesive. The pressure-sensitive adhesive layer may include any type of pressure-sensitive adhesive. The pressure-sensitive adhesive may be, for example, an acrylic pressure-sensitive adhesive, a polyurethane pressure-sensitive adhesive, a rubber-based pressure-sensitive adhesive, a polyester pressure-sensitive adhesive, a silicone pressure-sensitive adhesive, or a polyvinyl ether pressure-sensitive adhesive. In particular, the pressure-sensitive adhesive is preferably at least one selected from the group consisting of an acrylic pressure-sensitive adhesive, a polyurethane pressure-sensitive adhesive, and a rubber-based pressure-sensitive adhesive, and is more preferably an acrylic pressure-sensitive adhesive.

The acrylic pressure-sensitive adhesive may be, for example, a polymer including a structural unit derived from an alkyl (meth)acrylate having a linear or branched alkyl group (in other words, a polymer obtained by polymerization of at least an alkyl (meth)acrylate), or an acrylic polymer including a structural unit derived from a cyclic structure-containing (meth)acrylate (in other words, a polymer obtained by polymerization of at least a cyclic structure-containing (meth)acrylate). As used herein, the term "(meth) acrylate" refers to any of "acrylate" and "methacrylate," and this applies to other similar terms.

When the acrylic polymer is a copolymer, the copolymerization may be in any mode. The acrylic copolymer may be any of a block copolymer, a random copolymer, or a graft copolymer.

In particular, the acrylic pressure-sensitive adhesive is preferably an acrylic copolymer including (a1) a structural unit derived from (a1') an alkyl (meth)acrylate having a chain alkyl group of 1 to 20 carbon atoms (hereinafter also referred to as the "monomer component (a1')") and (a2) a structural unit derived from (a2') a functional group-containing monomer (hereinafter also referred to as the "monomer component (a2')").

The acrylic copolymer may further include (a3) a structural unit derived from a monomer component (a3') other than the monomer components (a1') and (a2').

In order to improve pressure-sensitive adhesive properties, the chain alkyl group of the monomer component (a1') preferably has 1 to 12 carbon atoms, more preferably 4 to 8 carbon atoms, still more preferably 4 to 6 carbon atoms. Examples of the monomer component (a1') include methyl (meth)acrylate, ethyl (meth)acrylate, propyl (meth)acrylate, n-butyl (meth)acrylate, 2-ethylhexyl (meth)acrylate, lauryl (meth)acrylate, tridecyl (meth)acrylate, and stearyl (meth) acrylate. Among these examples of the monomer component (a1'), butyl (meth)acrylate and 2-ethylhexyl (meth)acrylate are preferred, and butyl (meth)acrylate is more preferred.

The content of the structural unit (a1) is preferably from 50% by mass to 99.5% by mass, more preferably from 55% by mass to 99% by mass, even more preferably from 60% by mass to 97% by mass, still more preferably from 65% by mass to 95% by mass with respect to all structural units (100% by mass) of the acrylic copolymer.

Examples of the monomer component (a2') include a hydroxyl group-containing monomer, a carboxyl group-containing monomer, an epoxy group-containing monomer, an amino group-containing monomer, a cyano group-containing monomer, a keto group-containing monomer, and an alkoxysilyl group-containing monomer. Among these examples of the monomer component (a2), a hydroxyl group-containing monomer and a carboxyl group-containing monomer are preferred.

Examples of the hydroxyl group-containing monomer include 2-hydroxyethyl (meth)acrylate, 2-hydroxypropyl (meth)acrylate, 2-hydroxybutyl (meth)acrylate, 3-hydroxybutyl (meth)acrylate, and 4-hydroxybutyl (meth)acrylate, among which 2-hydroxyethyl (meth)acrylate is preferred.

Examples of the carboxyl group-containing monomer include (meth)acrylic acid, maleic acid, fumaric acid, and itaconic acid, among which (meth)acrylic acid is preferred.

The epoxy group-containing monomer may be, for example, glycidyl (meth)acrylate.

The amino group-containing monomer may be, for example, diaminoethyl (meth)acrylate.

The cyano group-containing monomer may be, for example, acrylonitrile.

The content of the structural unit (a2) is preferably from 0.1% by mass to 50% by mass, more preferably from 0.5% by mass to 40% by mass, even more preferably from 1.0% by mass to 30% by mass, still more preferably from 1.5% by mass to 20% by mass with respect to all structural units (100% by mass) of the acrylic copolymer.

Examples of the monomer component (a3') include cyclic structure-containing (meth)acrylates such as cyclohexyl (meth)acrylate, benzyl (meth)acrylate, isobornyl (meth) acrylate, dicyclopentanyl (meth)acrylate, dicyclopentenyl (meth)acrylate, dicyclopentenyloxyethyl (meth)acrylate, imide (meth)acrylate, and acryloyl morpholine; vinyl acetate; and styrene.

The content of the structural unit (a3) is preferably from 0% by mass to 40% by mass, more preferably from 0% by mass to 30% by mass, even more preferably from 0% by mass to 25% by mass, still more preferably from 0% by mass to 20% by mass with respect to all structural units (100% by mass) of the acrylic copolymer.

The examples of the monomer component (a1') may be used singly or in combination of two or more kinds thereof. The examples of the monomer component (a2') may also be used singly or in combination of two or more kinds thereof. The examples of the monomer component (a3) may also be used singly or in combination of two or more kinds thereof.

The acrylic copolymer may also be crosslinked with a crosslinking agent. Examples of the crosslinking agent include an epoxy crosslinking agent, an isocyanate crosslinking agent, an aziridine crosslinking agent, and a metal chelate crosslinking agent, which are known in the art. In the process of crosslinking the acrylic copolymer, the functional group derived from the monomer component (a2') can be used as a crosslinking point reactive with the crosslinking agent.

The pressure-sensitive adhesive layer may contains an energy ray-curable component in addition to the pressure-sensitive adhesive.

Examples of the energy ray-curable component, for example, in a case where the energy rays are ultraviolet rays, include trimethylolpropane tri(meth)acrylate, ethoxylated isocyanuric acid tri(meth)acrylate, ditrimethylolpropane tetra(meth)acrylate, tetramethylolmethane tetra(meth)acrylate, pentaerythritol tri(meth)acrylate, dipentaerythritol monohydroxypenta(meth)acrylate, dipentaerythritol hexa(meth)acrylate, caprolactone-modified dipentaerythritol hexa(meth)acrylate, 1,4-butylene glycol di(meth)acrylate, 1,6-hexanediol di(meth)acrylate, dicyclopentadiene dimethoxy di(meth)acrylate, polyethylene glycol di(meth)acrylate, oligoester (meth)acrylate, urethane (meth)acrylate oligomers, epoxy-modified (meth)acrylate, polyether (meth)acrylate, and other compounds having two or more ultraviolet-curable functional groups per molecule.

These energy ray-curable components may be used singly or in combination of two or more kinds thereof.

When the acrylic pressure-sensitive adhesive is used, the energy ray-curable component may be a compound having a functional group reactive with the functional group derived from the monomer component (a2') for the acrylic copolymer and also having an energy ray-curable functional group in the molecule. The functional group of this compound reacts with the functional group derived from the monomer component (a2') for the acrylic copolymer, so that the side chain of the acrylic copolymer can be polymerized by energy ray irradiation. Any pressure-sensitive adhesive other than the acrylic pressure-sensitive adhesive may also contain a copolymer component similarly having an energy ray-polymerizable side chain, in addition to the copolymer serving as the pressure-sensitive adhesive.

When the pressure-sensitive adhesive layer is energy ray-curable, the pressure-sensitive adhesive layer preferably contains a photopolymerization initiator. The photopolymerization initiator can increase the rate of curing the pressure-sensitive adhesive layer by energy ray irradiation. Examples of the photopolymerization initiator include benzophenone, acetophenone, benzoin, benzoin methyl ether, benzoin ethyl ether, benzoin isopropyl ether, benzoin isobutyl ether, benzoin benzoate, methyl benzoin benzoate, benzoin dimethyl ketal, 2,4-diethylthioxanthone, 1-hydroxycyclohexyl phenyl ketone, benzyl diphenyl sulfide, tetramethylthiuram monosulphide, azobisisobutyronitrile, benzil, dibenzil, diacetyl, 2-chloroanthraquinone, (2,4,6-trimethylbenzoyl)diphenylphosphine oxide, 2-benzothiazole-N,N-diethyldithiocarbamate, and oligo {2-hydroxy-2-methyl-1-[4-(1-propenyl)phenyl]propanone}.

The pressure-sensitive adhesive layer may also contain an inorganic filler. The addition of an inorganic filler can improve the hardness of the cured pressure-sensitive adhesive layer. The addition of an inorganic filler can also improve the thermal conductivity of the pressure-sensitive adhesive layer. The addition of an inorganic filler can also make the linear expansion coefficient of the sheet 10 close to that of a glass-based object, thereby improving the reliability of a device obtained by attaching the sheet 10 to the object and then optionally curing the sheet 10.

Examples of the inorganic filler include a powder of silica, alumina, talc, calcium carbonate, titanium white, red oxide, silicon carbide, boron nitride, or other inorganic materials; beads obtained by forming any of these materials into spheres; single crystal fibers; and glass fibers. Among them, a silica filler and an alumina filler are preferred inorganic fillers. These inorganic fillers may be used singly or in combination of two or more kinds thereof.

The inorganic filler is preferably surface-modified (coupled) with a compound having a curable functional group.

The curable functional group may be, for example, hydroxyl, carboxyl, amino, glycidyl, epoxy, ether, ester, or an ethylenically unsaturated bond-containing group. The compound having such a curable functional group may be, for example, a silane coupling agent.

The inorganic filler is more preferably surface-modified with a compound having an energy ray-curable functional group such as an ethylenically unsaturated bond-containing group, so that the pressure-sensitive adhesive layer can easily maintain fracture resistance (high strength) after it is cured. The ethylenically unsaturated bond-containing group may be, for example, vinyl, (meth)acryloyl, or maleimide. In view of high reactivity and versatility, a (meth)acryloyl group is preferred.

The inorganic filler surface-modified with a compound having an energy ray-curable functional group can make the pressure-sensitive adhesive layer tough, for example, when the sheet 10 is bonded to an object such as glass and then cured. This makes it easy to prevent the cured pressure-sensitive adhesive layer from breaking when the sheet 10 attached to an object such as a window or a mirror is removed with a suction cup attached to the sheet 10.

When containing the surface-modified inorganic filler, the pressure-sensitive adhesive layer preferably contains an additional energy-curable component.

The inorganic filler preferably has an average particle size of 1 µm or less, more preferably 0.5 µm or less. When the inorganic filler has an average particle size in such a range, the sheet 10 (specifically, the pressure-sensitive adhesive layer) can easily have higher light transparency and lower haze. The lower limit of the average particle size of the inorganic filler is preferably, but not limited to, 5 nm or more.

The average particle size of the inorganic filler can be determined as follows. Using a digital microscope, 20 inorganic filler particles are observed, and the average of the maximum and minimum diameters of each inorganic filler particle is measured as its diameter. The average particle size is defined as the average of the measurements.

The content of the inorganic filler is preferably from 0% by mass to 95% by mass, more preferably from 5% by mass to 90% by mass, still more preferably from 10% by mass to 80% by mass with respect to the total weight of the pressure-sensitive adhesive layer.

The cured pressure-sensitive adhesive layer preferably has a pencil hardness of HB or higher, more preferably F or higher, still more preferably H or higher. This further improves the function of the cured pressure-sensitive adhesive layer to protect the pseudo-sheet structure 20 and allows more sufficient protection of the pseudo-sheet structure 20. In some cases, there is no support provided on the surface (second adhesive surface 30B) of the pressure-sensitive adhesive layer opposite to its surface (first adhesive surface 30A) adjacent to the pseudo-sheet structure 20, and the attached object is more apart from the pressure-sensitive adhesive layer than from the pseudo-sheet structure 20. Even in such cases, the hardness mentioned above makes it easy to prevent the cured pressure-sensitive adhesive layer from being scratched after the sheet 10 is attached to the object. The pencil hardness is the value measured according to JIS K 5600-5-4.

The pressure-sensitive adhesive layer may also contain an additional component. Such an additional component may be, for example, a well-known additive such as an organic solvent, a flame retardant, a tackifier, an ultraviolet absorber, an antioxidant, a preservative, an antifungal agent, a plasticizer, an anti-foaming agent, or a wettability modifier.

The thickness of the adhesive layer 30 is determined as appropriate depending on the intended use of the sheet 10. In view of adhesive properties, for example, the adhesive layer 30 preferably has a thickness of from 3 μm to 150 μm, more preferably from 5 μm to 100 μm.

(Method of Producing the Sheet)

There is no limitation on how to produce the sheet 10 according to an embodiment. The sheet 10 is produced, for example, thorough the process described below.

First, an adhesive layer 30-forming composition is applied onto a release sheet to form a coating film. The coating film is then dried to form an adhesive layer 30. Subsequently, conductive linear-bodies 22 are arranged and aligned on the first adhesive surface 30A of the adhesive layer 30 to form a pseudo-sheet structure 20. For example, while the adhesive layer 30-bearing release sheet is placed around the outer surface of a drum member, a conductive linear-body 22 is spirally wound on the first adhesive surface 30A of the adhesive layer 30 by rotating the drum member. Subsequently, the bunch of conductive linear-bodies 22 formed by the spiral winding are cut along the axial direction of the drum member. In this way, the pseudo-sheet structure 20 is formed and placed on the first adhesive surface 30A of the adhesive layer 30. The adhesive layer 30-bearing release sheet, on which the pseudo-sheet structure 20 is formed, is then taken out of the drum member. After this process, the release sheet is removed from the adhesive layer 30, so that the sheet 10 is obtained. In this method, for example, the unit for feeding the conductive linear-body 22 may be moved along a direction parallel to the axis of the drum member being rotated, so that the spacing L between adjacent conductive linear-bodies 22 in the pseudo-sheet structure 20 can be easily controlled.

Alternatively, after the conductive linear-bodies 22 are arranged to form the pseudo-sheet structure 20, the second surface 20B of the resulting pseudo-sheet structure 20 may be bonded to the first adhesive surface 30A of the adhesive layer 30 to form the sheet 10.

(Properties of the Sheet)

The sheet 10 according to an embodiment preferably has a light transmittance of 70% or more, more preferably from 70% to 100%, still more preferably from 80% to 100%. When attached to a window of a car or the like, for example, the sheet 10 is required to allow the viewer to see and identify other vehicles, walkers, signals, signs, road conditions, and others. When attached to a mirror as an object, the sheet 10 is required to allow clear imaging. For these purposes, the sheet 10 with a light transmittance of 70% or more can easily achieve such visibility or clear imaging.

The light transmittance of the sheet 10 (pseudo-sheet structure 20) can be determined by measuring the light transmittance of the sheet 10 at wavelengths in the visible region (380 nm to 760 mm) with a light transmittance meter and calculating the average of the measurements.

The sheet 10 according to an embodiment preferably has a surface resistance (Ω/square) of 800 Ω/square or less, more preferably from 0.01 Ω/square to 500 Ω/square, still more preferably from 0.05 Ω/square to 300 Ω/square. When the sheet 10 is used as a heating element, the sheet 10 is required to have low surface resistance in view of a reduction in the applied voltage. When the sheet 10 has a surface resistance of 800 Ω/square or less, the applied voltage can be easily reduced.

The surface resistance of the sheet 10 is measured by the following method. First, a silver paste for improving electrical bonding is applied to both ends of the pseudo-sheet structure 20 of the sheet 10. Subsequently, a glass substrate with copper tapes attached to both ends is provided, and the sheet 10 is attached to the glass substrate in such a way that the silver paste is in contact with the copper tapes. The resistance of the sheet 10 is then measured with an electrical tester, from which the surface resistance of the sheet 10 is calculated.

(Method of Using the Sheet)

The sheet 10 according to an embodiment is, for example, attached to an object when used. When the adhesive layer 30 is curable, the adhesive layer 30 is cured after the sheet 10 is attached to an object. When the sheet 10 is attached to an object, the pseudo-sheet structure 20 side of the sheet 10 may be attached to the object (in other words, the sheet 10 may be attached to the object with the pseudo-sheet structure 20 placed between the first adhesive surface 30A of the adhesive layer 30 and the object), or the second adhesive surface 30B of the sheet 10 may be attached to the object.

When the support 32 described below is absent on the first adhesive surface 30A side of the adhesive layer 30, the pseudo-sheet structure 20 side of the sheet 10 is preferably attached to the object. In such a case, the pseudo-sheet structure 20 is sufficiently protected by both the object and the adhesive layer 30. This would be suitable for practical use because the sheet 10 can have improved impact resistance. When the sheet 10 (pseudo-sheet structure 20) is used as a heating element, the adhesive layer 30 also contributes to prevention of electric shock during heating (energization).

(Modifications)

The sheet 10 according to an embodiment is not limited to the above and may be modified or improved. Hereinafter, modifications of the sheet 10 according to an embodiment will be described. In the description below, the same component as described above for the sheet 10 according to an embodiment will be represented by the same reference sign in the drawings, and the description of the component will be omitted or simplified.

First Modification

Figure 3:
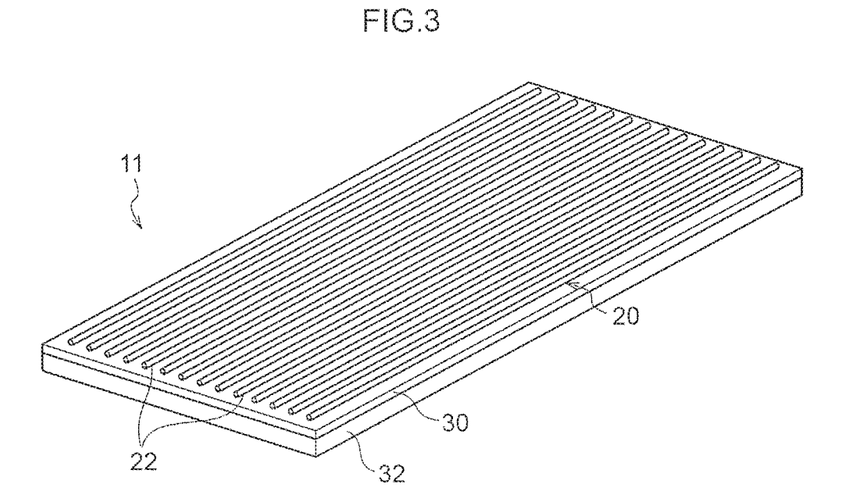
FIG. 3 is a schematic perspective view showing a first modification of a sheet according to an embodiment.

As shown in FIG. 3, for example, the sheet 10 according to an embodiment may also be provided with a support 32, which is disposed on the first surface 20A of the pseudo-sheet structure 20 or on the second adhesive surface 30B of the adhesive layer 30. When the support 32 is disposed on the first surface 20A of the pseudo-sheet structure 20, the support 32 can be fixed with the first adhesive surface 30A of the adhesive layer 30 exposed through the pseudo-sheet structure 20 in the sheet 10.

FIG. 3 shows a sheet 11 including the support 32 disposed on the second adhesive surface 30B of the adhesive layer 30.

The support 32 may be, for example, a paper sheet, a thermoplastic resin film, a film formed by curing a curable resin, a metal foil, or a glass film. The thermoplastic resin film may be, for example, a film of a resin such as polyester, polycarbonate, polyimide, polyolefin, polyurethane, or acrylic resin.

The surface of the support 32 (the surface exposed from the sheet 10), not facing the adhesive layer 30 or the pseudo-sheet structure 20, may be subjected to a hard coat treatment with an ultraviolet-curable resin or other materials so that the ability to protect the sheet 10 (pseudo-sheet structure 20) can be enhanced.

Second Modification

The sheet 10 according to an embodiment may also be provided with a release layer 34, for example, which is disposed on at least one of the first surface 20A of the pseudo-sheet structure 20 or the second adhesive surface 30B of the adhesive layer 30.

Figure 4:
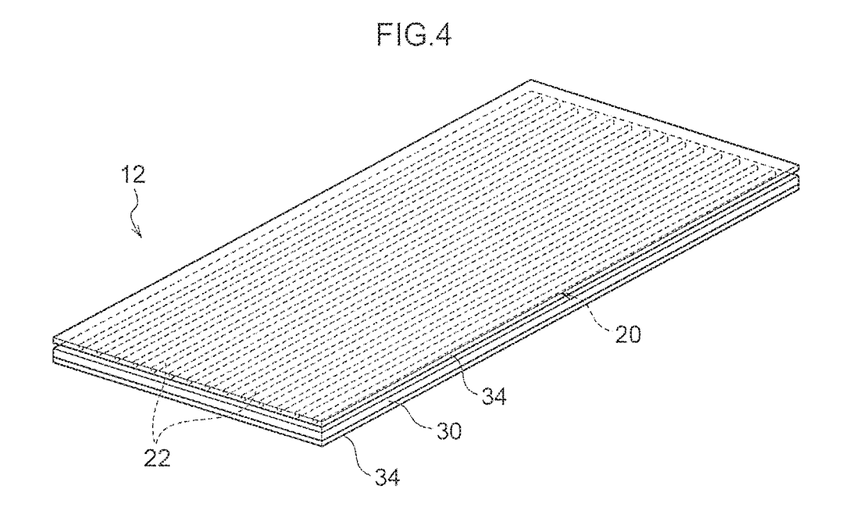
FIG. 4 is a schematic perspective view showing a second modification of a sheet according to an embodiment.

FIG. 4 shows a sheet 12 having release layers 34 disposed on both the first surface 20A of the pseudo-sheet structure 20 and the second adhesive surface 30B of the adhesive layer 30.

The release layer 34 may be of any type. In view of ease of handling, for example, the release layer 34 preferably includes a release backing and a release agent layer formed by applying a release agent onto the release backing. The release layer 34 may include a release agent layer on only one side of the release backing or include release agent layers on both sides of the release backing.

The release backing may be, for example, a paper backing, a laminated sheet including a paper backing or any other backing and a thermoplastic resin (such as polyethylene) disposed thereon, or a plastic film. The paper backing may be, for example, glassine paper, coated paper, or cast coated paper. The plastic film may be, for example, a film of polyester such as polyethylene terephthalate, polybutylene terephthalate, or polyethylene naphthalate; or a film of polyolefin such as polypropylene or polyethylene. The release agent may be, for example, an olefin resin, a rubber elastomer (e.g., a butadiene resin or an isoprene resin), a long-chain alkyl resin, an alkyd resin, a fluororesin, or a silicone resin.

The thickness of the release layer 34 is not limited. In general, the release layer 34 preferably has a thickness of from 20 μm to 200 μm, more preferably from 25 μm to 150 μm.

In the release layer 34, the thickness of the release agent layer is not limited. When the release agent layer is formed by applying a solution containing the release agent, the thickness of the release agent layer is preferably from 0.01 μm to 2.0 μm, more preferably from 0.03 μm to 1.0 μm.

When a plastic film is used as the release backing, the plastic film preferably has a thickness of from 3 μm to 150 μm, more preferably from 5 μm to 100 μm.

Third Modification

Figure 5:
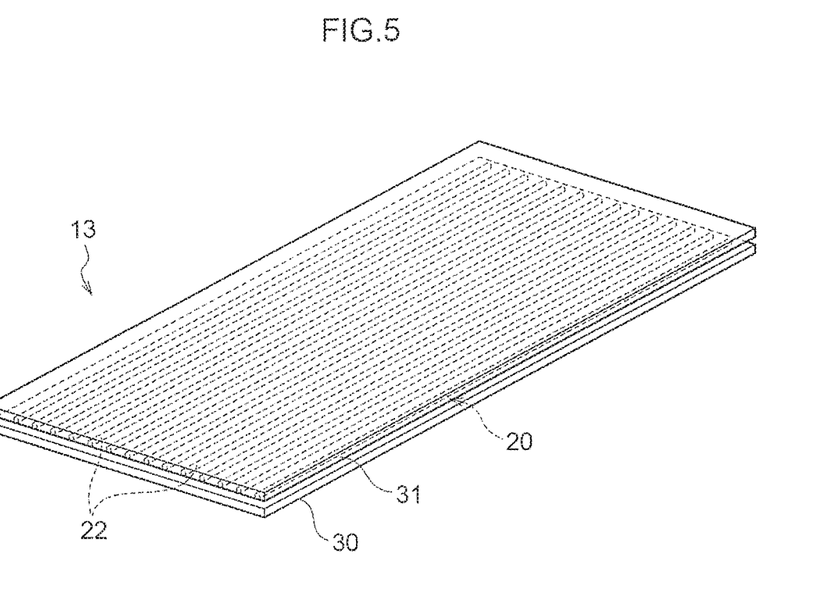
FIG. 5 is a schematic perspective view showing a third modification of a sheet according to an embodiment.

As shown in FIG. 5, for example, the sheet 10 according to an embodiment may form a sheet 13 having an additional adhesive layer 31 disposed on the first surface 20A of the pseudo-sheet structure 20. In other words, the sheet 10 according to an embodiment may also be provided with adhesive layers on both sides (first and second surfaces 20A and 20B) of the pseudo-sheet structure 20.

The adhesive layers 30 and 31 may have the same or different compositions.

The adhesive layers 30 and 31 each preferably have a thickness of from 3 μm to 150 μm, more preferably from 5 μm to 100 μm. The total of the thicknesses of the adhesive layers 30 and 31 (the total thickness of the adhesive layers) is preferably from 10 μm to 300 μm, more preferably from 20 μm to 200 μm.

Fourth Modification

Figure 6:
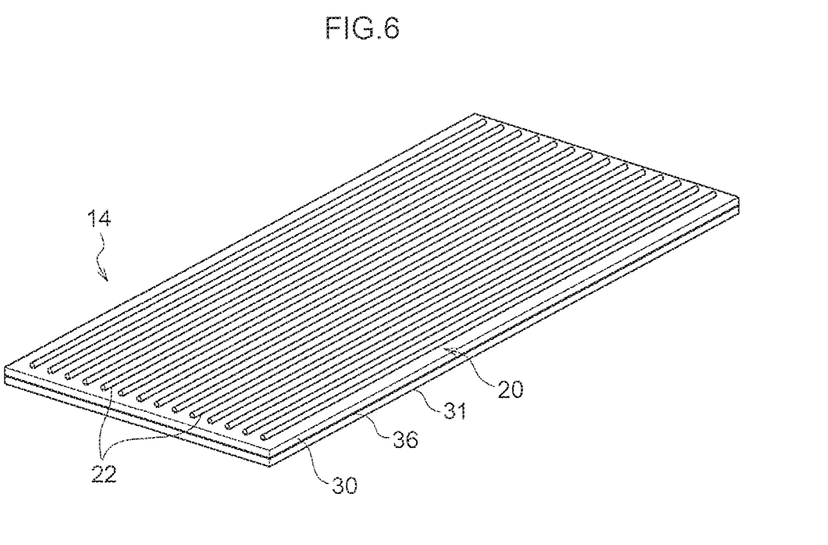
FIG. 6 is a schematic perspective view showing a fourth modification of a sheet according to an embodiment.

As shown in FIG. 6, for example, the sheet 10 according to an embodiment may form a sheet 14 having an additional adhesive layer 31 disposed on the second adhesive surface 30B of the adhesive layer 30 with a support layer 36 interposed therebetween. In other words, the sheet 10 according to an embodiment may also be provided with an adhesive sheet (such as a double-sided tape), which is disposed on the second surface 20B of the pseudo-sheet structure 20 and includes a pair of adhesive layers 30 and 31 stacked with the support layer 36 interposed therebetween.

The support layer 36 may be, for example, a paper sheet, a thermoplastic resin film, a film formed by curing a curable resin, a metal foil, or a glass film. The thermoplastic resin film may be, for example, a film of a resin such as polyester, polycarbonate, polyimide, polyolefin, polyurethane, or acrylic resin.

Fifth Modification

Figure 7:
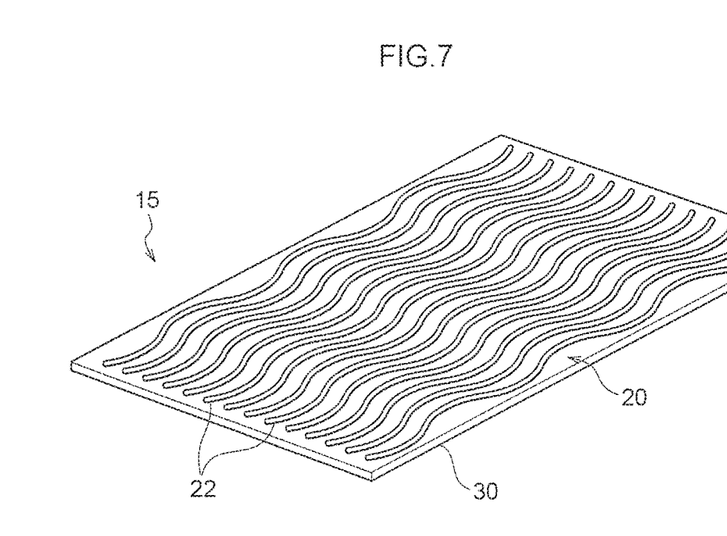
FIG. 7 is a schematic perspective view showing a fifth modification of a sheet according to an embodiment.

In the sheet 10 according to an embodiment, for example, the conductive linear-bodies 22 of the pseudo-sheet structure 20 may be periodically curved or bent as shown in FIG. 7. Specifically, the conductive linear-bodies 22 may be, for example, in the form of waves such as sine waves, square waves, triangular waves, or saw-tooth waves. In other words, for example, the pseudo-sheet structure 20 may have a plurality of wave-shaped conductive linear-bodies 22 extending in one direction and arranged at regular intervals in a direction perpendicular to the extending direction of the conductive linear-bodies 22.

FIG. 7 shows a sheet 15 having a pseudo-sheet structure 20 in which a plurality of wave-shaped conductive linear-bodies 22 extending in one direction are arranged at regular intervals in a direction perpendicular to the extending direction of the conductive linear-bodies 22.

Sixth Modification

Figure 8:
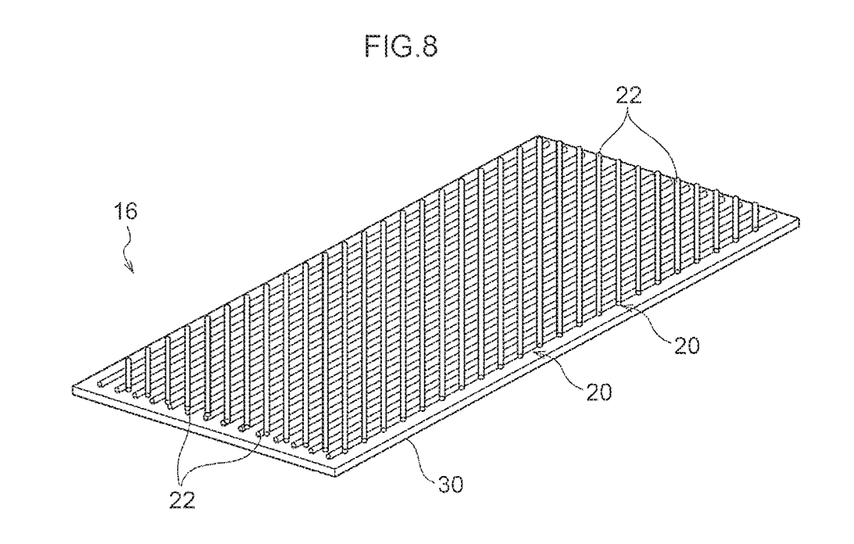
FIG. 8 is a schematic perspective view showing a sixth modification of a sheet according to an embodiment.

As shown in FIG. 8, for example, the sheet 10 according to an embodiment may include a laminate of two or more pseudo-sheet structures 20. Two or more pseudo-sheet structures 20 may be stacked in such a way that the respective sets of conductive linear-bodies 22 are parallel or crossed. The respective sets of conductive linear-bodies 22 are preferably crossed, so that the conductive linear-bodies 22 arranged parallel to one another and never intersecting in one pseudo-sheet structure 20 can be crosslinked in a sense and electrically connected by the conductive linear-bodies 22 of another pseudo-sheet structure 20.

In this case, the light transparency may decrease because the conductive linear-bodies 22 in one pseudo-sheet structure 20 are superposed on spaces (spaces between adjacent conductive linear-bodies 22) in another maintaining pseudo-sheet structure 20, so that spaces are obstructed. In this case, however, sufficient light transparency can be easily ensured when the L/D value is controlled to fall within the above range.

FIG. 8 shows a sheet 16 in which two pseudo-sheet structures 20 are stacked in such a way that the respective sets of conductive linear-bodies 22 are crossed.

Seventh Modification

Figure 9:
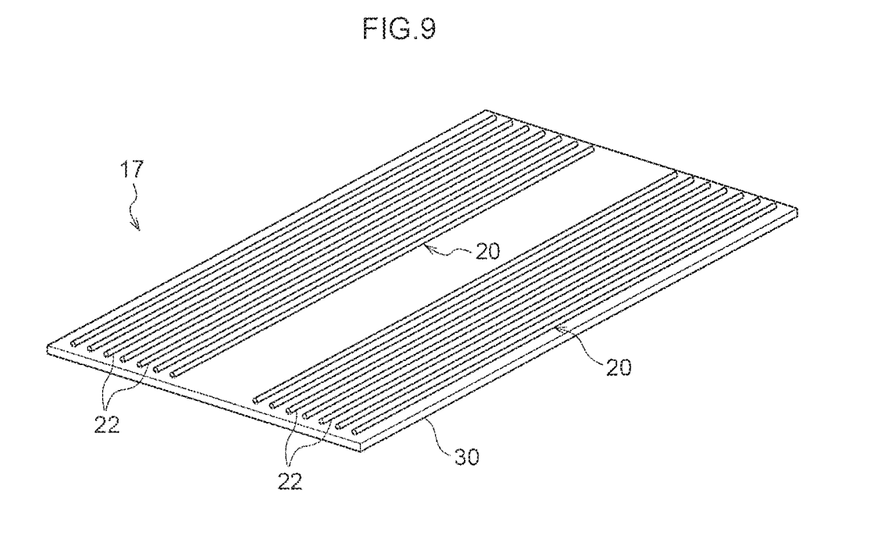
FIG. 9 is a schematic perspective view showing a seventh modification of a sheet according to an embodiment.

As shown in FIG. 9, for example, the sheet 10 according to an embodiment may have two or more pseudo-sheet structures 20 arranged in the sheet surface direction (the direction along the sheet surface). Two or more pseudo-sheet structures 20 may be arranged in such a way that the respective sets of conductive linear-bodies 22 are parallel or crossed.

FIG. 9 shows a sheet 17 having two pseudo-sheet structures 20 arranged in such a way that the respective sets of conductive linear-bodies 22 are parallel to each other.

Eighth Modification

Figure 10:
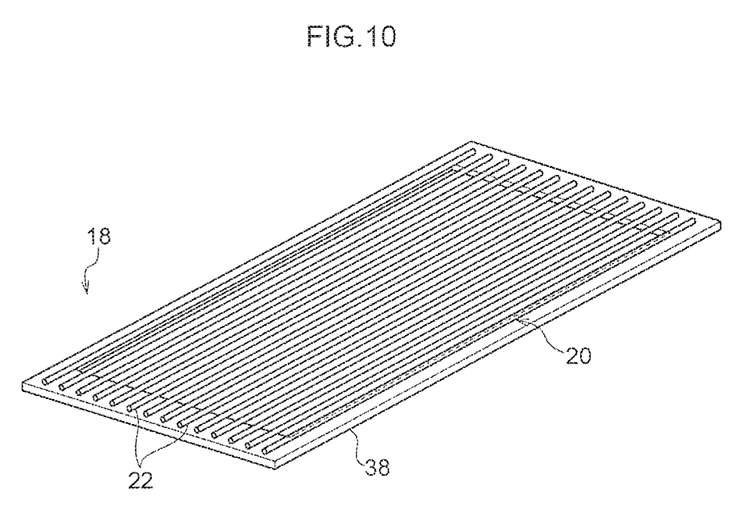
FIG. 10 is a schematic perspective view showing an eighth modification of a sheet according to an embodiment.

The sheet 10 according to an embodiment may be free of any adhesive layer 30. In the sheet 10, for example, the pseudo-sheet structure 20 may be so configured that at least an end part of each of two or more conductive linear-bodies 22 is fixed with a fixing member and the fixed conductive linear-bodies 22 each have another independent part not in contact with any other member. Specifically, for example, as shown in FIG. 10, the sheet 10 may also be a sheet 18 (free-standing sheet) including a pseudo-sheet structure 20 having edge parts fixed with a fixing member 38 (e.g., a double-sided tape, a coreless double-sided adhesive film composed of a single adhesive layer, a solder, a heat sealable film, a nipping member such as a clip or a vise, or any other fixing member).

In a non-limiting mode, edge parts of the pseudo-sheet structure 20 are fixed with the fixing member 38. Alternatively, only a pair of opposite edge parts of the pseudo-sheet structure 20 (only end parts of the conductive linear-bodies 22) may be fixed with the fixing member 38.

The sheet 10 according to an embodiment may be any combination of the first to seventh modifications. For example, the sheet 10 according to an embodiment may be (1) a combination of the structure of the second embodiment with the release layer 34 and a support 32 disposed on the first surface 20A of the pseudo-sheet structure 20, (2) a combination of the structure of the third modification and a support 32 disposed on the surface of another adhesive layer 31 (the surface not facing the pseudo-sheet structure 20), (3) a combination of the structure of the third modification and a release layer disposed on the surface of at least one of the two adhesive layers 30 or 31 (the surface not facing the pseudo-sheet structure 20), or (4) a combination of the structure of the fourth modification and a support 32 disposed on the first surface 20A of the pseudo-sheet structure 20.

(Heating Element and Heating Device Having Heating Element)

The sheet 10 according to an embodiment has high light transparency and includes a pseudo-sheet structure with low surface resistance. Therefore, the sheet 10 according to an embodiment is suitable for use as a heating element. Therefore, a heating element including the sheet 10 according to an embodiment (a heating element according to an embodiment) has high light transparency and can work with a lower applied voltage.

Figure 11:
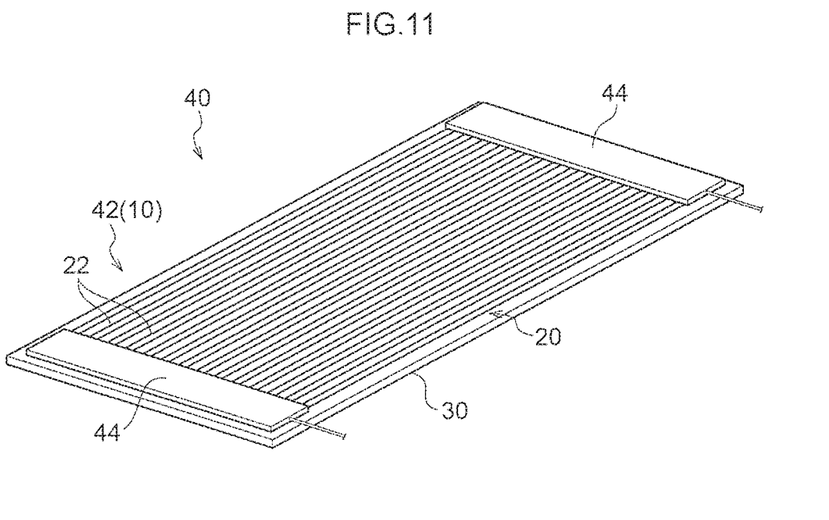
FIG. 11 is a schematic perspective view showing a heating device according to an embodiment.

As shown in FIG. 11, for example, a heating device 40 according to an embodiment includes a heating element 42 according to an embodiment (a heating element including the sheet 10 according to an embodiment) and electric supply parts 44 for supplying electricity to the heating element 42 (its pseudo-sheet structure 20). The electric supply parts 44 are made of, for example, a metal material and electrically connected to the ends of the pseudo-sheet structure 20 of the heating element 42 (sheet 10). The connection between the pseudo-sheet structure 20 and the electric supply parts 44 is performed by a well-known method such as soldering in such a way that electricity can be supplied to each conductive linear-body 22 of the pseudo-sheet structure 20.

Applications of the heating device 40 according to an embodiment includes mirrors for bathrooms or other purposes, windows for vehicles such as cars, railroads, ships, and aircrafts, building windows, defoggers for use on eye wear and other objects, vehicle windows, lighting surfaces of signals, and deicers for use on signs and other objects.

EXAMPLES

Hereinafter, the invention will be more specifically described with reference to examples. It will be understood that each example is not intended to limit the invention.

Example 1

A carbon nanotube forest was grown on a 50-mm-wide silicon wafer by catalytic CVD using argon gas as carrier gas, acetylene as a carbon source, and a thermal CVD (chemical vapor deposition) system with three furnaces as a vapor deposition system.

While one end of the carbon nanotube forest was picked up, carbon nanotube sheets were drawn with a width of 7 mm from the carbon nanotube forest. The carbon nanotube sheets were bundled through a metal ring with a diameter of 5 mm. While the bundled sheets were placed on a rubber drum with a diameter of 3 cm, the rubber drum was swung in the axial direction of the drum so that the bundled sheets were allowed to slide on the rubber drum. The bundled sheets were formed into a ribbon-shaped strand by the friction generated during the sliding. In this state, the resulting ribbon-shaped linear-body was wound on a bobbin. The drawing of sheets from the forest, the bundling of the sheets, the stranding of the bundle, and the winding of the ribbon-shaped linear-body were performed continuously.

Subsequently, a removable pressure-sensitive adhesive sheet (MTAR (product name), a double-sided tape, available from MeCan Imaging Inc.) was wound around the rubber drum with one pressure-sensitive adhesive surface facing outward, while the sheet was kept from becoming wrinkled. Both circumferential ends of the sheet were fixed with double-sided tapes. The carbon nanotube linear-body from the bobbin was bonded, in the vicinity of an end of the rubber drum, to part of the surface of the pressure-sensitive adhesive sheet, and then wound on the rubber drum while being unwound from the bobbin. The rubber drum was gradually moved at a constant rate in a direction parallel to the axis of the drum so that the linear-body was spirally wound at regular intervals on the rubber drum. The pressure-sensitive adhesive sheet and the carbon nanotube linear-body bonded thereto were cut parallel to the axis of the drum, resulting in a sheet having a pseudo-sheet structure disposed on the pressure-sensitive adhesive sheet and including aligned carbon nanotube linear-bodies (see FIG. 6). The diameter D of the linear-bodies and the spacing L between the linear-bodies in the pseudo-sheet structure were measured by the methods described above. As a result, the diameter D of the linear-bodies was 20 µm, and the spacing L between the aligned linear-bodies was 1,700 µm.

Example 2

A sheet having a pseudo-sheet structure disposed on a pressure-sensitive adhesive sheet and including aligned metal wire linear-bodies was obtained as in Example 1, except that a metal wire linear-body (metal type: stainless steel, product number: AISI 316L (manufactured by Goodfellow), diameter: 50 µm) was used instead of the carbon nanotube sheet linear-body. The diameter D of the metal wire linear-bodies and the spacing L between the metal wire linear-bodies in the pseudo-sheet structure were measured by the methods described above. As a result, the diameter D of the metal wire linear-bodies was 50 µm, and the spacing L between the aligned metal wire linear-bodies was 1,700 µm.

Example 3

A sheet having a pseudo-sheet structure disposed on a pressure-sensitive adhesive sheet and including aligned carbon nanotube linear-bodies was obtained as in Example 1, except that the rubber drum moving rate was changed to be lower than that in Example 1 when the linear-body was wound. The diameter D of the linear-bodies and the spacing L between the linear-bodies in the pseudo-sheet structure were measured by the methods described above. As a result, the diameter D of the linear-bodies was 20 µm, and the spacing L between the aligned linear-bodies was 800 µm.

Example 4

A sheet having a pseudo-sheet structure disposed on a pressure-sensitive adhesive sheet and including aligned carbon nanotube linear-bodies was obtained as in Example 1, except that the rubber drum moving rate was changed to be lower than that in Example 1 when the linear-body was wound. The diameter D of the linear-bodies and the spacing L between the linear-bodies in the pseudo-sheet structure were measured by the methods described above. As a result, the diameter D of the linear-bodies was 20 µm, and the spacing L between the aligned linear-bodies was 200 µm.

Comparative Example 1

A sheet having a pseudo-sheet structure disposed on a pressure-sensitive adhesive sheet and including aligned carbon nanotube linear-bodies was obtained as in Example 1, except that the rubber drum moving rate was changed to be lower than that in Example 1 when the linear-body was wound. The diameter D of the linear-bodies and the spacing L between the linear-bodies in the pseudo-sheet structure were measured by the methods described above. As a result, the diameter D of the linear-bodies was 20 µm, and the spacing L between the aligned linear-bodies was 10 µm.

Comparative Example 2

A sheet having a pseudo-sheet structure disposed on a pressure-sensitive adhesive sheet and including aligned carbon nanotube linear-bodies was obtained as in Example 1, except that the rubber drum moving rate was changed to be higher than that in Example 1 when the linear-body was wound. The diameter D of the linear-bodies and the spacing L between the linear-bodies in the pseudo-sheet structure were measured by the methods described above. As a result, the diameter D of the linear-bodies was 20 µm, and the spacing L between the aligned linear-bodies was 10,000 µm.

Example 5

A sheet having a pseudo-sheet structure disposed on a pressure-sensitive adhesive sheet and including aligned carbon nanotube linear-bodies was obtained as in Example 1, except that the diameter of the carbon nanotube sheet linear-body was changed from 20 µm to 15 µm and that the rubber drum moving rate was changed to be lower than that in Example 1 when the linear-body was wound. The diameter D of the linear-bodies and the spacing L between the linear-bodies in the pseudo-sheet structure were measured by the methods described above. As a result, the diameter D of the linear-bodies was 15 µm, and the spacing L between the aligned linear-bodies was 100 µm.

Example 6

A sheet having a pseudo-sheet structure disposed on a pressure-sensitive adhesive sheet and including aligned metal wire linear-bodies was obtained as in Example 1, except that a metal wire linear-body (metal type: stainless steel, product number: AISI 316L (manufactured by Good fellows), diameter: 50 µm) was used instead of the carbon nanotube sheet linear-body and that the rubber drum moving rate was changed to be higher than that in Example 1 when the metal wire linear-body was wound. The diameter D of the linear-bodies and the spacing L between the linear-bodies in the pseudo-sheet structure were measured by the methods described above. As a result, the diameter D of the metal wire linear-bodies was 50 µm, and the spacing L between the aligned metal wire linear-bodies was 5,000 µm.

Example 7

A sheet having a pseudo-sheet structure disposed on a pressure-sensitive adhesive sheet and including aligned metal wire linear-bodies was obtained as in Example 1, except that a metal wire linear-body (metal type: tungsten, product name: TGW-B (manufactured by TOKUSAI TungMoly Co., LTD.), diameter: 14 µm) was used instead of the carbon nanotube sheet linear-body. The diameter D of the linear-bodies and the spacing L between the linear-bodies in the pseudo-sheet structure were measured by the methods described above. As a result, the diameter D of the metal wire linear-bodies was 14 µm, and the spacing L between the aligned metal wire linear-bodies was 1,700 µm.

Example 8

A sheet having a pseudo-sheet structure disposed on a pressure-sensitive adhesive sheet and including aligned metal wire linear-bodies was obtained as in Example 1, except that a metal wire linear-body (metal type: molybdenum, product name: TGW-BS (manufactured by TOKUSAI TungMoly Co., LTD.), diameter: 25 µm) was used instead of the carbon nanotube sheet linear-body. The diameter D of the linear-bodies and the spacing L between the linear-bodies in the pseudo-sheet structure were measured by the methods described above. As a result, the diameter D of the metal wire linear-bodies was 25 µm, and the spacing L between the aligned metal wire linear-bodies was 1,700 µm

[Measurements]

The volume resistivity R of the linear-bodies, the diameter D of the linear-bodies, and the spacing L between the linear-bodies were measured by the methods described above with respect to the pseudo-sheet structure of the sheet obtained in each example. The light transmittance and surface resistance of the sheet obtained in each example were also measured by the methods described above. Table 1 shows the results.

In Table 1, values in parentheses in the "Diameter D" and "Spacing L" columns are in units of cm. Values in the "L×D" and "$(D^2/R) \times (1/L)$" columns are calculated from the diameter D and the spacing L each in units of cm.

TABLE 1

| | | pseudo-Sheet Structure (linear-body Structure) | | | | | | |
|---|---|---|---|---|---|---|---|---|
| | Material | Volume Resistivity R [Ω · cm] | Diameter D [μm(cm)] | Spacing L [μm(cm)] | L/D | (D²/R) × (1/L) | Light Transmittance (%) | Surface Resistance (Ω/square) |
| Example 1 | CNT | 4.7 × 10⁻³ | 20 (0.0020) | 1700 (0.17) | 85 | 0.005 | 93 | 470 |
| Example 2 | Stainless Steel | 7.5 × 10⁻⁵ | 50 (0.0050) | 1700 (0.17) | 34 | 1.961 | 92 | 1.5 |
| Example 3 | CNT | 4.7 × 10⁻³ | 20 (0.0020) | 800 (0.08) | 40 | 0.011 | 86 | 100 |
| Example 4 | CNT | 4.7 × 10⁻³ | 20 (0.0020) | 200 (0.02) | 10 | 0.043 | 82 | 25 |
| Comparative Example 1 | CNT | 4.7 × 10⁻³ | 20 (0.0020) | 10 (0.001) | 0.5 | 0.851 | 18 | 1.3 |
| Comparative Example 2 | CNT | 4.7 × 10⁻³ | 20 (0.0020) | 10000 (1) | 500 | 0.001 | 93 | 915 |
| Example 5 | CNT | 4.7 × 10⁻³ | 15 (0.0015) | 300 (0.01) | 6.676667 | 0.048 | 80 | 17 |
| Example 6 | Stainless Steel | 7.5 × 10⁻⁵ | 50 (0.0050) | 5000 (0.5) | 100 | 0.667 | 92 | 5.2 |
| Example 7 | Tungsten | 1.0 × 10⁻⁵ | 14 (0.0014) | 1700 (0.17) | 121 | 1.153 | 92 | 1.3 |
| Example 8 | molybdenum | 6.6 × 10⁻⁶ | 25 (0.0025) | 1700 (0.17) | 68 | 5.57 | 92 | 0.25 |

The results show that the pseudo-sheet structures of the sheets of the examples have a higher light transmittance and a lower surface resistance than those of the comparative examples.

The disclosure of U.S. Provisional Application No. 62/258,342 is hereby incorporated by reference in its entirety.

All Documents, patent applications, and technical standards described herein are incorporated by reference herein to the same extent as if each of the Documents, patent applications, and technical standards had been specifically and individually indicated to be incorporated by reference.

The invention claimed is:

1. A sheet comprising:
   a structure having a first surface and a second surface opposite to the first surface;
   a support provided on an entire surface of the first surface of the structure; and
   an adhesive layer having a surface on which the structure is disposed,
   wherein the second surface of the structure is directly on top of the surface of the adhesive layer,
   wherein the support has no opening,
   wherein the structure comprises a plurality of linear-bodies with a volume resistivity R from $1.0 \times 10^{-7}$ Ωcm to $7.5 \times 10^{-5}$ Ωcm, extending in one direction, arranged parallel to one another, and spaced apart from one another,
   wherein the linear-bodies comprise a metal wire, the sheet satisfying the relation: $121 \geq L/D \geq 3$, wherein D represents a diameter of the linear-bodies and $D \geq 0.0014$, and L represents a spacing between adjacent ones of the linear-bodies, and also satisfying the relation: $5.57 \geq (D^2/R) \times (1/L) \geq 0.003$, wherein D represents the diameter of the linear-bodies and $D \geq 0.0014$, L represents the spacing between adjacent ones of the linear-bodies, R represents the volume resistivity of the linear-bodies, and D and L are in units of cm,
   wherein the adhesive layer is adapted to be bonded to an object,
   wherein each of the plurality of linear-bodies disposed on the surface of the adhesive layer has a part that faces the surface of the adhesive layer, and
   wherein the adhesive layer is provided to an entirety of the part of each linear-body facing the surface of the adhesive layer.

2. The sheet according to claim 1, which comprises a laminate of a plurality of the structures.

3. The sheet according to claim 1, wherein the linear-bodies of the structure each have an end part at least fixed with a fixing member and each have another independent part not in contact with the fixing member.

4. A heating element comprising the sheet according to claim 1.

5. A heating device comprising the heating element according to claim 4 and an electric supply part for supplying electricity to the heating element.

6. The heating device according to claim 5, which is a defogger.

7. The heating device according to claim 5, which is a deicer.

8. The sheet according to claim 1, wherein the adhesive layer is curable.

9. The sheet according to claim 1, wherein the adhesive layer comprises an energy ray-curable component.

10. A sheet comprising:
    a structure having a first surface and a second surface opposite to the first surface;
    a support provided on an entire surface of the first surface of the structure; and
    an adhesive layer having a surface on which the structure is disposed,
    wherein the second surface of the structure is directly on top of the surface of the adhesive layer,
    wherein the support has no opening,
    wherein the structure comprises a plurality of linear-bodies with a volume resistivity R from $1.0 \times 10^{-7}$ Ωcm to $1.0 \times 10^{-1}$ Ωcm, extending in one direction, arranged parallel to one another, and spaced apart from one another, the sheet satisfying the relation: $350 \geq L/D \geq 3$, wherein D represents a diameter of the linear-bodies and $D \geq 0.0014$, and L represents a spacing between adjacent ones of the linear-bodies, and also satisfying the relation: $20 \geq (D^2/R) \times (1/L) \geq 0.003$, wherein D represents the diameter of the linear-bodies and $D \geq 0.0014$, L represents the spacing between adjacent ones of the linear-bodies, R represents the volume resistivity of the linear-bodies, and D and L are in units of cm, and
    wherein the adhesive layer is adapted to be bonded to an object,
    wherein each of the plurality of linear-bodies disposed on the surface of the adhesive layer has a part that faces the surface of the adhesive layer, and
    wherein the adhesive layer is provided to an entirety of the part of each linear-body facing the surface of the adhesive layer.

11. A sheet comprising:
a structure having a first surface and a second surface opposite to the first surface;
a support provided on an entire surface of the first surface of the structure; and
an adhesive layer having a surface on which the structure is disposed,
wherein the second surface of the structure is directly on top of the surface of the adhesive layer,
wherein the support has no opening,
wherein the structure comprises a plurality of linear-bodies with a volume resistivity R from $1.0 \times 10^{-7}$ Ωcm to $7.5 \times 10^{-5}$ Ωcm, extending in one direction, arranged parallel to one another, and spaced apart from one another,
wherein the linear-bodies comprise a metal wire, the sheet satisfying the relation: $350 \geq L/D \geq 3$, wherein D represents a diameter of the linear-bodies and $D \geq 0.0014$, and L represents a spacing between adjacent ones of the linear-bodies, and also satisfying the relation: $20 \geq (D^2/R) \times (1/L) \geq 0.003$, wherein D represents the diameter of the linear-bodies and $D \geq 0.0014$, L represents the spacing between adjacent ones of the linear-bodies, R represents the volume resistivity of the linear-bodies, and D and L are in units of cm, and
wherein the adhesive layer is adapted to be bonded to an object,
wherein each of the plurality of linear-bodies disposed on the surface of the adhesive layer has a part that faces the surface of the adhesive layer, and
wherein the adhesive layer is provided to an entirety of the part of each linear-body facing the surface of the adhesive layer.

12. The sheet according to claim 1, wherein the adhesive layer is present in the spacing between adjacent ones of the linear-bodies.

13. The sheet according to claim 10, wherein the adhesive layer is present in the spacing between adjacent ones of the linear-bodies.

14. The sheet according to claim 11, wherein the adhesive layer is present in the spacing between adjacent ones of the linear-bodies.

15. The sheet according to claim 1 has a light transmittance of 70% or more.

16. The sheet according to claim 10 has a light transmittance of 70% or more.

17. The sheet according to claim 11 has a light transmittance of 70% or more.

* * * * *